W. P. McNEEL.
SPEED REGULATOR.
APPLICATION FILED JULY 9, 1917.

1,302,821.

Patented May 6, 1919.
2 SHEETS—SHEET 2.

W. P. McNeel
Inventor

Witnesses by C. A. Snow & Co.
Attorneys

UNITED STATES PATENT OFFICE.

WILLIAM PINKNEY McNEEL, OF SAN ANTONIO, TEXAS.

SPEED-REGULATOR.

1,302,821.  Specification of Letters Patent.  Patented May 6, 1919.

Application filed July 9, 1917.  Serial No. 179,538.

*To all whom it may concern:*

Be it known that I, WILLIAM P. McNEEL, a citizen of the United States, residing at San Antonio, in the county of Bexar and State of Texas, have invented a new and useful Speed-Regulator, of which the following is a specification.

The present invention relates to variable speed transmission mechanisms, and aims to provide a novel and improved speed regulator for use in motion picture film apparatus such as is disclosed in my Patent No. 1,186,924 granted June 15, 1916.

It is the object of the invention to provide novel and improved, yet simple and inexpensive means for providing a variable speed as the roll of film rotates and changes in diameter.

A further object of the invention is the provision of the speed regulator of the nature indicated which can be readily reset manually.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein—

Figure 1:
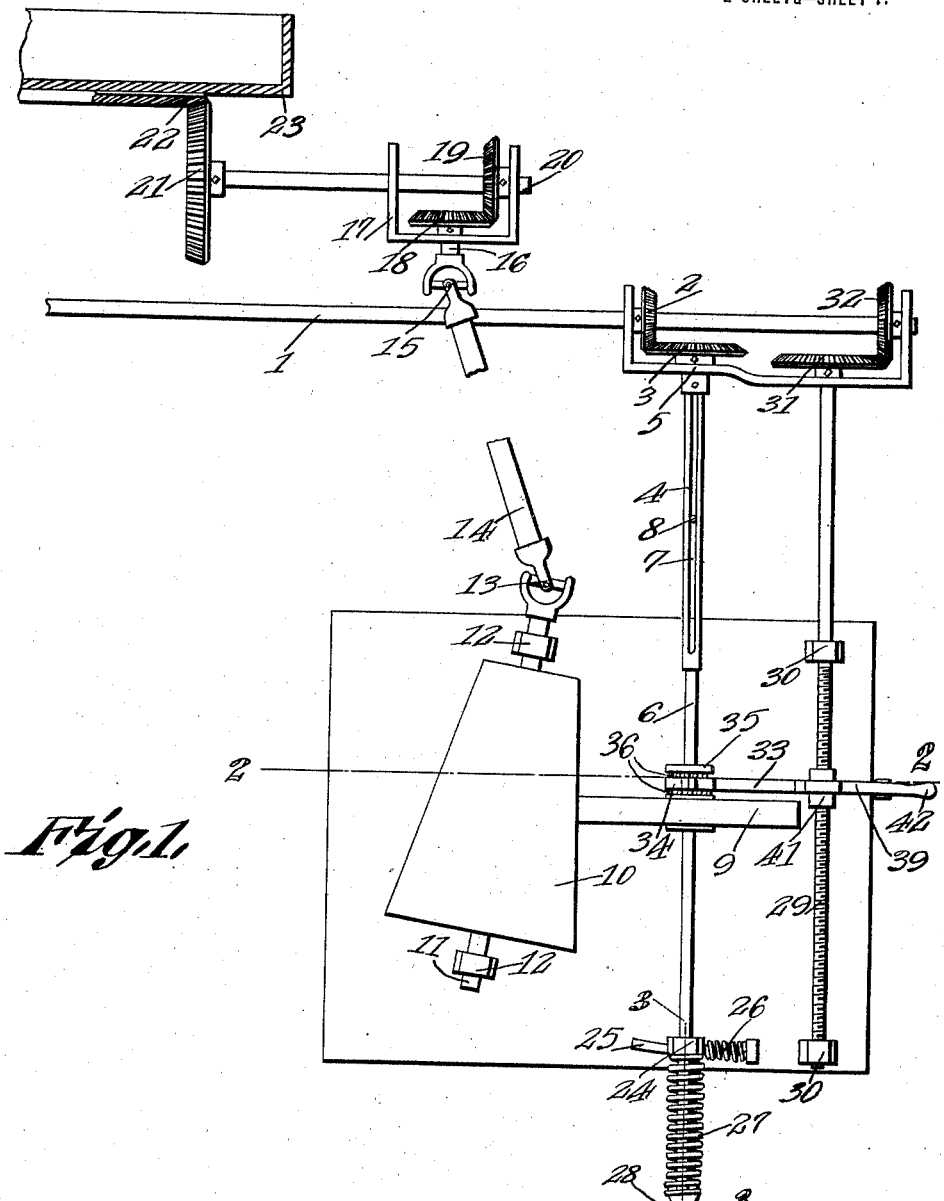

Figure 1 is an elevation of the mechanism.

Figure 2:
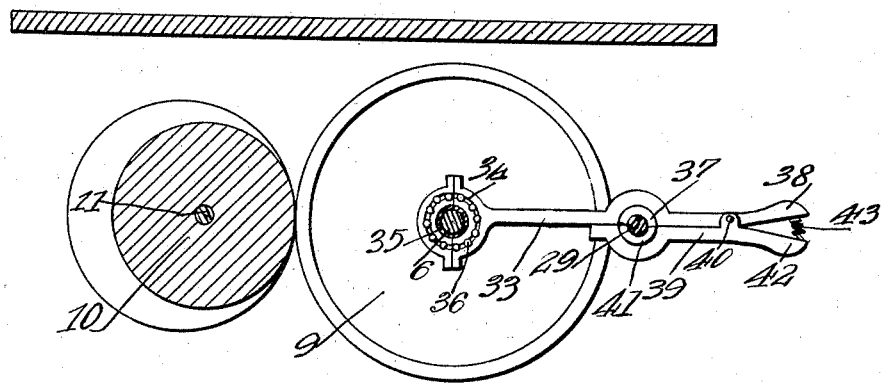
Figure 3:
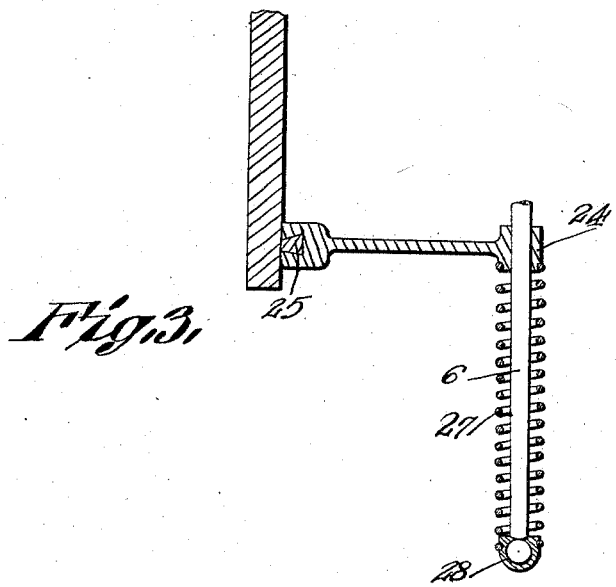

Figs. 2 and 3 are enlarged sectional details on the respective lines 2—2 and 3—3 of Fig. 1.

The mechanism embodies a drive shaft 1, arranged horizontally as illustrated, which may be used for winding up the film (not shown). This shaft has secured thereon a bevel gear 2 meshing with a bevel gear 3 secured to the upper end of a vertical tubular shaft 4 journaled loosely within a yoke 5 through which the shaft 1 is also journaled. A shaft 6 fits telescopically within the tubular shaft 4, the latter being provided with a longitudinal slot 7 in which a pin 8 carried by the shaft 6 works, so that said shafts rotate together although the shaft 6 can be raised and lowered axially thereof. A friction wheel 9 is secured to the vertical shaft 6 and bears against a cone 10 mounted on a shaft 11 journaled in bearings 12 carried by the frame, the shaft 11 being arranged obliquely relatively to the shaft 6, and having its upper end connected by a universal joint 13 with the lower end of the shaft 14. The upper end of the shaft 14 is in turn connected by a universal joint 15 with a shaft 16 journaled in a yoke 17 and having secured thereon a bevel gear 18 meshing with a bevel gear 19 secured upon a horizontal counter shaft 20 journaled in the yoke 17. The shaft 20 has a bevel gear 21 secured thereon meshing with an annular bevel gear 22 that is secured to the carrier or turntable 23 for the upper roll of film as disclosed in said patent, although it is to be understood that the present mechanism is to be used for various purposes when a variable speed of one driven member is desired. It will be noted that when the shaft 6 is raised and lowered to move the friction wheel 9 with it, said friction wheel in moving longitudinally of the cone 10 will vary the speed of rotation of said cone and the part driven therefrom.

The shaft 4, as above indicated, is mounted sufficiently loose in the yoke 5, to permit the shafts 4 and 6 to swing slightly, whereby to remove the friction wheel 9 from the cone 10 when the friction wheel is to be returned to starting position. The lower portion of the shaft 6 is journaled slidably in a bearing 24 slidably engaging an arcuate guide 25 carried by the frame, whereby to enable said bearing to slide sidewise, a spring 26 being disposed between the frame and bearing 24 whereby to press the wheel 9 against the cone to prevent slipping. The coiled wire retractile spring 27 surrounds the lower portion of the shaft 6 and has its upper end secured to the bearing 24 and its lower end secured to a swivel cup or bearing 28 in which the lower end of the shaft 6 is seated, said spring 27 serving to raise the shaft 6 and friction wheel, the spring being expanded when the shaft is moved downwardly.

In order to feed the friction wheel 9 downwardly, a vertical screw 29 is journaled in bearings 30 carried by the frame, and has a bevel gear 31 at its upper end meshing with the beveled gear 32 secured to the drive shaft 1, the screw 29 being journaled to the yoke 5.

An arm or member 33 is moved by the rotation of the screw 29 to move the friction wheel 9, and for this purpose, the arm 33 is provided at one end with a ring 34 disposed within an annular groove of the hub 35 of the friction wheel 9, and anti-frictional balls 36 are disposed above and below the ring 34 to reduce friction. The arm 33 is provided between its ends with a threaded portion or half nut 37 to engage the screw 29, and the arm has a handle 38 at its free end. A clamping member 39 is pivoted as at 40, between its ends to the arm 33 between the half nut 37 and handle 38, and is provided at one end with a threaded portion or half nut 41 complementing the half nut 37 to also engage the screw and provide a nut embracing the screw to be moved thereby. The member 39 is provided at its other end with a handle 42 complementing the handle 38, a spring 43 separating the handle 38 and 42, whereby to move the half nuts 37 and 41 together into engagement with the screw.

In operation, the shaft 1 being rotated, will rotate the shaft 6 and friction wheel 9, which transmits motion to the cone 10 and parts driven thereby. A screw 29 is also rotated by the shaft 1, thereby moving the nut comprising the half nuts 37—41 downwardly, and the arm 33 will therefore move the friction wheel downwardly with it, thereby gradually reducing the speed of rotation of the cone 10. When the parts have completed their movement, the friction wheel 9 can be restored readily to starting position, by grasping the handles 38—42 and swinging them toward each other, which will separate the half-nuts 37—41, and the arm 33 can then be swung to remove the half nut 37 from the screw. At the same time, the arm 33 can be pulled slightly, to pull the shaft 6 with the bearing 24 away from the cone, thus relieving the pressure of the friction wheel against the cone under the influence of the spring 26, and the spring 27 will then raise the shaft 6. When the parts have been returned to starting position, by releasing the handles 38—42, the spring 26 will again move the shaft 6 toward the cone bringing the friction wheel 9 into contact therewith, and the spring 43 will move the half nuts together so as to embrace the screw. The mechanism is then in starting position for a new operation.

Having thus described the invention, what is claimed is:—

1. A mechanism of the character described, embodying a cone, a friction wheel mounted to bear against and move along said cone, spring means for pressing the wheel against the cone and returning said wheel to starting position, a screw, and a device embodying an arm connected at one end with said wheel and having a handle at its other end and a half-nut between its ends to engage said screw, and a member dle complementing the aforesaid handle, pivoted between its ends to said arm between said handle and half nut and having a half nut at one end to complement said half nut, the other end of said member having a handle.

2. A mechanism of the character described, embodying a cone, a friction wheel mounted to bear against and move along said cone, means for returning the wheel to normal position, a screw, and a device embodying an arm connected at one end with said wheel and having a half-nut between its ends to engage said screw, and a member pivoted to said arm and having a half-nut at one end complemental to the first mentioned half-nut.

In testimony that I claim the foregoing as my own, I have hereto affixed my signature in the presence of two witnesses.

WILLIAM PINKNEY McNEEL.

Witnesses:
G. A. LOWTHER,
W. B. BISHOP.

Copies of this patent may be obtained for five cents each, by addressing the "Commissioner of Patents, Washington, D. C."